United States Patent Office 3,102,633
Patented Sept. 3, 1963

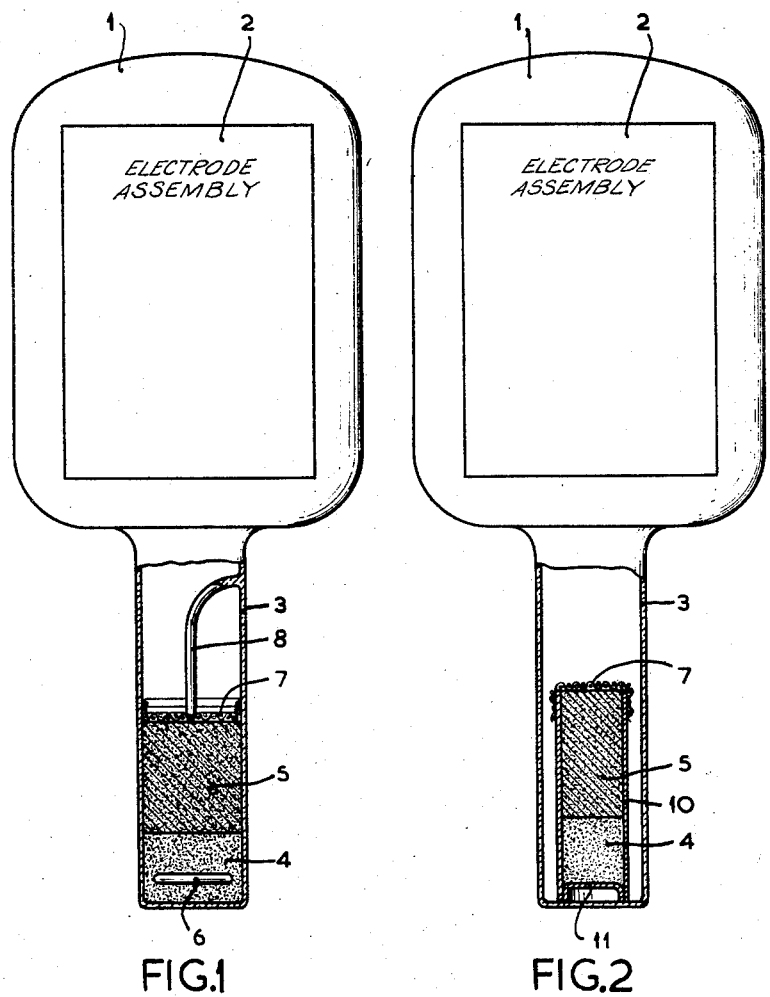

3,102,633
GETTER STRUCTURE
Egon Otto Michael Baronetzky, Aachen, Germany, assignor to North American Philips Company, Inc., New York, N.Y., a corporation of Delaware
Filed Nov. 27, 1959, Ser. No. 855,842
Claims priority, application Germany Dec. 24, 1958
5 Claims. (Cl. 206—.4)

The present invention relates to electric discharge tubes containing as a getter an alkali metal taken up in graphite, and to methods of manufacturing such tubes.

It is known to provide an electric discharge tube internally with an extensive layer of graphite and to expose the latter to the action of cesium vapor. The present method concerns tubes, for example electron multipliers, in which the cesium is also present on the electrodes. In this case, therefore, the high vapor pressure of the cesium adsorbed at the surface of the graphite is not troublesome.

According to the invention, an electric discharge tube, which contains as a getter an alkali metal taken up in graphite, comprises a gas-tight container which is closed by means of a gas-permeable cover. Below this cover, provision is in succession made of: a pure graphite layer, an alkali metal chemically combined with graphite, and the residue of a reaction mixture from which the alkali metal is produced.

In the arrangement according to the invention, the discharge tube does not contain free alkali metal, which would give rise to serious trouble in many discharge tubes. The thickness of the graphite layer should be such that, with the production of alkali metal to be expected, a sufficient quantity of free graphite is invariably left. The alkali metal vapor pressure in the graphite compounds is far lower than that of the free alkali metal.

The container may consist of insulating material, for example glass, and for producing the exothermally proceeding reaction yielding the alkali metal a short-circuiting ring of good electrical conductivity is to be provided in the reaction mixture. A glass-container for the getter may at the same time form part of the wall of the tube or alternatively be freely disposed in the discharge tube. The container may alternatively consist of metal. It is known to evaporate a getter so as to be adsorbed to a material having a large surface (for example glass wool). So far, however, nothing has been known of the formation of a compound with the absorbed material and the resulting drop of vapor pressure of the relevant getter.

In general, it is advisable to free the alkali metal with the tube being connected to the pump, since gas is constantly set free during production of the alkali metal.

The atomic ratio between the overall quantity of graphite and the quantity of alkali metal set free should exceed 30.

The getters according to the invention have the advantage over barium mirrors that they do not require an extensive surface, while being capable of combining with gases at a high rate. An additional advantage is that no production of hydrocarbon occurs during the successive take-up of carbon-monoxide and water vapor.

In order that the invention may be readily carried into effect, examples will be described in detail with reference to the accompanying drawing, in which FIGS. 1 and 2 show discharge tubes with getters according to the invention.

In FIG. 1, an electric discharge tube 1 comprising a glass envelope and an electrode system 2 is represented schematically. A glass tube 3 sealed to it contains at its bottom a layer of a reaction mixture 4, for example, zirconium and potassium bichromate, in a weight ratio of 4:1 and having a weight of 150 mgs. Above the reaction mixture 4 provision is made of a graphite layer 5 containing approximately 90 mgs. of graphite ground in vacuum. The reaction mixture 4 contains a nickel ring 6. A nickel sieve 7 is pressed on the graphite by means of a sealed glass rod 8.

After grinding the graphite in vacuum, it is stored dry under argon, just as the zirconium powder after its production.

Subsequently to heating the electrodes and the glass vessel together with the tube 3, the nickel ring 6 is heated by means of high-frequency current to such a degree as to initiate the reduction of the potassium bichromate by the zirconium. The potassium combines with the graphite in the lowest layers to form an alkali graphite, the composition of the compound gradually decreasing from $C_8K$ to $C_{60}K$. The lowest layers of the graphite turn brown, the superimposed layers blue. The upper layers should remain free from alkali metal.

In FIG. 2, the glass tube 3 contains a nickel tube 10 to which a bottom 11 is brazed, while provision is again made of a reaction mixture 4 and a graphite layer 5. In this case, the nickel sieve 7 is spot-welded to the tube 10.

What is claimed is:

1. A getter structure adapted to be sealed within an evacuated envelope comprising a container having gas impermeable side and bottom wall portions and a gas permeable cover, and a getter composition within said container consisting of a layer of pure graphite, a layer of alkali metal combined with graphite, and a layer which is the residue of a reaction mixture producing the alkali metal, in that order from the cover downward.

2. A getter structure as claimed in claim 1 in which the reaction mixture contains a short-circuiting ring, of good electric conductivity, while the container of the getter consists of insulating material which may at the same time form the wall of the discharge tube.

3. A getter structure as claimed in claim 1 in which the container is metal.

4. A getter structure as claimed in claim 1 in which the ratio between the available graphite and the alkali metal set free, calculated in atoms, is at least 30:1.

5. A getter structure adapted to communicate with the interior of an evacuated envelope comprising an enclosure having a gas-permeable portion and a gas-impermeable portion, and a getter composition within said enclosure consisting of a layer of pure graphite, a layer of alkali metal combined with graphite, and a layer which is the residue of a reaction mixture producing the alkali metal, said gas-permeable portion of said enclosure being in communication with the interior of the envelope and adjacent the graphite layer.

References Cited in the file of this patent

UNITED STATES PATENTS

| | | |
|---|---|---|
| 1,797,131 | De Boer | Mar. 17, 1931 |
| 2,082,268 | Varian | June 1, 1937 |
| 2,116,244 | King | May 3, 1938 |

OTHER REFERENCES

"Materials Technology for Electron Tubes," W. H. Kohl, Reinhold Publishing Corporation, page 287; 1951.